United States Patent
Majumdar et al.

(10) Patent No.: US 9,213,525 B2
(45) Date of Patent: Dec. 15, 2015

(54) METHODS FOR BDI-DRIVEN SERVICE COMPONENT ARCHITECTURES AND DEVICES THEREOF

(75) Inventors: Bijoy Majumdar, Secunderabad (IN); Deepti Parachuri, Hyderabad (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/562,768

(22) Filed: Jul. 31, 2012

(65) Prior Publication Data

US 2013/0036398 A1 Feb. 7, 2013

(30) Foreign Application Priority Data

Aug. 1, 2011 (IN) .......................... 2634/CHE/2011

(51) Int. Cl.
*G06F 9/44* (2006.01)
(52) U.S. Cl.
CPC ........................................ *G06F 8/10* (2013.01)
(58) Field of Classification Search
None
See application file for complete search history.

(56) References Cited

U.S. PATENT DOCUMENTS

2009/0300580 A1* 12/2009 Heyhoe et al. ................ 717/106
2012/0240103 A1* 9/2012 Padmanabhuni et al. ..... 717/121

OTHER PUBLICATIONS

Chang-Hyun Jo, "A BDI Agent-Based Software Process", 2005, vol. No. 9, pp. 102-121.*

Booth et al., "Web Services Architecture," (W3C Working Group note) retrieved from http://www.w3.org/TR/2004/NOTE-ws-arch-20040211/, on Mar. 7, 2012 (2004).
Sprott et al., "Understanding Service-Oriented Architecture" retrieved from http://msdn.microsoft.com/en-us/library/aa480021.aspx, on Mar. 7, 2012 (2004).
Wooldridge et al., "Intelligent Agents: Theory and Practice". Knowledge Engineering Review. vol. 10:2:115-152 (1995).
Breese et al., "Empirical Analysis of Predictive Algorithms for Collaborative Filtering" Proceedings of the 14th Conference on Uncertainty in 1998.
Dickinson et al, "Agents are not (just) Web services: Considering BDI agents and web services," 9 pp. (2005).
Dardenne et al., "Goal-directed requirements acquisition," Science of Computer Programming, 20(1-2):3-50 (1993).
Kolp et al., "A goal-based organizational perspective on multi-agents architectures," In Proc. of the 8th Int. Workshop on Intelligent Agents: Agent Theories (2001).
Basaveshwar Engineering College, "Enerprise Systems and Service Oriented Arcitectures", International Workshop, Mar. 7-19, 2008.
Edwards, M., "Service Component Architecture (SCA)", OASIS, Open CSA, Mar. 23, 2007.
Yu, E., "Modelling Organizations for Information Systems Requirements Engineering", In Proc. of the 1st Int. Symposium on Requirements Engineering, Jan. 1993, RE'93, pp. 34-41, San Jose, USA.
Wooldridge, M., "Reasoning About Rational Agents", The MIT Press, 2000, ISBN 0-262-23213-8.

* cited by examiner

*Primary Examiner* — Isaac T Tecklu
(74) *Attorney, Agent, or Firm* — LeClairRyan, a Professional Corporation (57) ABSTRACT

Methods, devices, and computer-readable storage media for developing a business application include mapping one or more requirements of the business application to a Belief Desire Intention (BDI) architecture. The BDI architecture is mapped to a Service Component Architecture (SCA). The business application is developed based at least in part on the mapping of the one or more requirements to the BDI architecture and on the mapping of the BDI architecture to the SCA.

21 Claims, 9 Drawing Sheets

METHODS FOR BDI-DRIVEN SERVICE COMPONENT ARCHITECTURES AND DEVICES THEREOF

This application claims the benefit of Indian Patent Application Filing No. 2634/CHE/2011, filed Aug. 1, 2011, which is hereby incorporated by reference in its entirety.

FIELD

This technology generally relates to methods for developing business applications and, more particularly, relates to methods for enhancing a Service Component Architecture (SCA) with a Belief Desire Intention (BDI) mapping strategy.

BACKGROUND

Service Component Architecture (SCA) has been the de facto specification taking momentum in the space of Service-Oriented Architecture (SOA). Corporations and independent software vendors (ISVs) have collaborated to build a platform-independent SCA to grace the SOA paradigm. SCA assists in defining applications as an assembly of components wired to each other to solve business requirements. Information systems of the future will need to be agile to adapt to ever-changing organizational environments. However, existing software development methodologies have traditionally been inspired by programming concepts rather than organizational ones and thus have failed to bridge the gap between software systems and their operational environments. SCA too has not defined a procedure by which to design the components and the assembly of components in totality. The SCA specification is stark in explaining approaches by which to design and model the components of the business domain.

SUMMARY

An exemplary method for developing a business application includes mapping, by a business application development computing device, one or more requirements of the business application to a Belief Desire Intention (BDI) architecture. The BDI architecture is mapped by the business application development computing device to a Service Component Architecture (SCA). The business application is developed by the business application development computing device based at least in part on the mapping of the one or more requirements to the BDI architecture and on the mapping of the BDI architecture to the SCA. The business application development computing device provides the business application.

An exemplary non-transitory computer-readable storage medium having stored thereon instructions for developing a business application. The instructions include machine executable code which, when executed by at least one processor, causes the processor to perform steps including mapping one or more requirements of the business application to a Belief Desire Intention (BDI) architecture. The BDI architecture is mapped to a Service Component Architecture (SCA). The business application is developed based at least in part on the mapping of the one or more requirements to the BDI architecture and on the mapping of the BDI architecture to the SCA. The business application is provided.

An exemplary business application development computing device for developing a business application, the device including one or more processors and a memory coupled to the one or more processors which are configured to execute programmed instructions stored in the memory, the programmed instructions including mapping one or more requirements of the business application to a Belief Desire Intention (BDI) architecture. The BDI architecture is mapped to a Service Component Architecture (SCA). The business application is developed based at least in part on the mapping of the one or more requirements to the BDI architecture and on the mapping of the BDI architecture to the SCA. The business application is provided.

This technology provides effective methods and devices for developing business applications. Additionally, this technology provides a methodology for enhancing a Service Component Architecture (SCA) with a Belief Desire Intention (BDI) mapping strategy by which business applications can be developed effectively and completely. Beneficially, the BDI mapping strategy provides an effective means to encapsulate the desired user intentions. The resulting architecture is technology agnostic, enhances the alignment between business and information technologies, and is adaptable to rapidly changing business requirements.

DETAILED DESCRIPTION

This technology is directed to methods, systems, and non-transitory computer-readable storage media for developing business applications. Such business application development techniques may include, for example, enhancing a Service Component Architecture (SCA) with a Belief Desire Intention (BDI) mapping strategy.

In particular, this disclosure describes an agent-oriented style of designing SCA components and their assembly. Additionally, a mapping of business analysis to BDI architecture to solution development is described. Formal organizational modeling techniques are presented in context with a design value proposition SOA solution. SCA in its present form provides a 'framework dimension.' But adding the disclosed agent-oriented engineering will provide a much-needed 'design dimension' to SCA.

Figure 1:
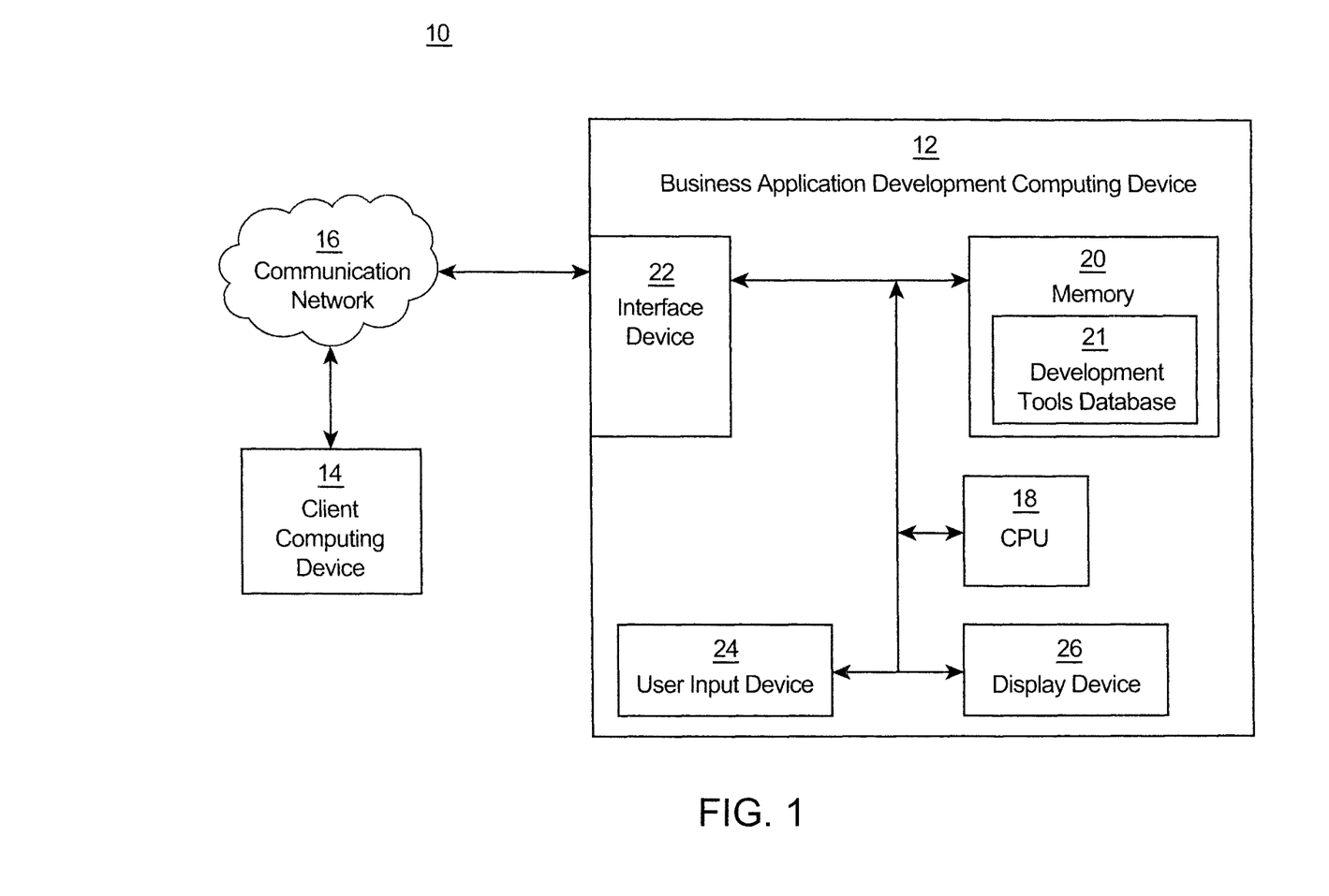
FIG. 1 is a block diagram of an environment with an exemplary business application development computing device.

Referring more specifically to FIG. 1, an environment 10 with an exemplary business application development computing device 12 is illustrated. The environment 10 includes the business application development computing device 12 and one or more client computing devices 14 which are all coupled together by one or more communication networks 16, although this environment can include other numbers and types of systems, devices, components, and elements in other configurations. This technology provides a number of advantages including providing more effective and efficient methods and devices for developing business applications. Additionally, this technology provides a methodology for enhancing a Service Component Architecture (SCA) with a Belief Desire Intention (BDI) mapping strategy by which business applications can be developed effectively and completely.

In this example, the business application development computing device 12 maps one or more requirements of the business application to a BDI architecture. The BDI architecture is mapped by the business application development computing device 12 to an SCA. The business application development computing device 12 develops the business application based at least in part on the mapping of the one or more requirements to the BDI architecture and on the mapping of the BDI architecture to the SCA. The business application is provided by the business application development computing device 12. The business application development computing device 12 may, however, perform other numbers and types of functions.

The business application development computing device 12 includes a central processing unit (CPU) or processor 18, a memory 20 with a development tools database 21, an interface device 22, a user input device 24, and a display device 26 which are coupled together by a bus or other link, although other numbers and types of systems, devices, components, and elements in other configurations and locations can be used. The processor 18 in the business application development computing device 12 executes a program of stored instructions for one or more aspects of the present technology as described and illustrated by way of the examples herein, although other types and numbers of processing devices and logic could be used and the processor could execute other numbers and types of programmed instructions.

The memory 20 in the business application development computing device 12 stores these programmed instructions for one or more aspects of the present technology as described and illustrated herein, although some or all of the programmed instructions could be stored and executed elsewhere. In this example, the memory 20 includes the development tools database 21 which may include i* or other strategic dependency modeling tools (e.g., TAOM4E tools), and/or SCA tools (e.g., Apache Tuscany), although other types and numbers of databases and development tools which are stored at other locations could be used. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18 in the business application development computing device 12, can be used for the memory 20 in the business application development computing device 12.

The interface device 22 in the business application development computing device 12 may be used to operatively couple and communicate between the business application development computing device 12 and the one or more client computing devices 14 via one or more of the communications networks 16, although other types and numbers of communication networks or systems with other types and numbers of connections and configurations can be used. By way of example only, the one or more communications networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

The user input device 24 in the business application development computing device 12 may include a haptic touchscreen interface, and/or a computer keyboard and a computer mouse, although other types and numbers of user input devices can be used. In this example, the user input device 24 in the business application development computing device 12 may be used to access and utilize one or more development tools within development tools database 21, although other types of tools, data, and information could be accessed or utilized in other manners.

The display device 26 in the business application development computing device 12 includes a computer display screen, such as a CRT or LCD screen, although other types and numbers of displays could be used. In this example, the display device 26 in the business application development computing device 12 may be used to display any number of development tool components or notations stored in development tools database 21, although other types of data and information and other types of graphical user interfaces could be displayed.

Each of the one or more client computing devices 14 includes a central processing unit (CPU) or processor, a memory, an interface device, a user input device, and a display which are coupled together by a bus or other link, although each could comprise other numbers and types of devices, elements, and components in other configurations. Each of the one or more client computing devices 14 may be remotely located from the business application development computing device 12, although other configurations could be used. The processor in each of the one or more client computing devices 14 can execute a non-transitory program of stored instructions for one or more aspects of the present technology as described and illustrated by way of the examples herein, although other types and numbers of processing devices and logic could be used and the processor could execute other numbers and types of programmed instructions. The display of each of the one or more client computing devices 14 may be used to display a user based interface (e.g., an interface to database 21) with one or more form fields. The user input device of each of the one or more client computing devices 14 may be used to input data in the form fields of the user based interfaces which are configured to directly provide the data to the business application development computing device 12 for developing business applications, although other types and numbers of functions could be performed. Although one client computing device 14 is shown, other numbers of client computing devices and other types and numbers of systems and devices which can display and provide interaction with the user based interface can be used.

Although examples of the business application development computing device 12 and the one or more client computing devices 14 are described herein, each of these systems can be implemented on any suitable computer system or computing device (e.g., mobile or otherwise). It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on a computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

The present disclosure involves providing effective methods and devices for developing business applications. This technology provides a methodology for enhancing a Service Component Architecture (SCA) with a Belief Desire Intention (BDI) mapping strategy by which business applications can be developed effectively and completely. Beneficially, the BDI mapping strategy provides an effective means to encapsulate the desired user intentions. The resulting architecture is technology agnostic, enhances the alignment between business and information technologies (IT), and is adaptable to rapidly changing business requirements.

Increasing flexibility of IT systems has become a common strategy for most enterprises coping with the ever-growing demands of user requirements. In general, flexibility may be achieved by breaking a larger functionality into smaller components to deliver a variety of end-user capabilities. SCA emerged as a solution for standard representation of the components in an application. Other standards such as CORBA and DCOM emerged but were not able to become global standards for a variety of reasons. But with the popularity of internet, standards like HTML and HTTP developed as a way to represent software components and link together potentially millions of computer systems.

Service Component Architecture (SCA) is a set of specifications which describe a model for building applications and systems using a Service-Oriented Architecture (SOA). SCA uses open standards like web services. SCA is built around the concept of separating implementation code from service interfaces and providing a compositional view of interconnection between services. SCA by itself does not define a business or application logic. Rather, it models a bird-eye-view of the system. Consequently, a BDI-based design may help structure the SCA components and its assembly.

Software agents, one strand of research and development into flexible IT systems, extend message passing architectures to exhibit properties of being social, reactive, proactive and autonomous. Agents and web services are not conceptually distinct. Both are active building blocks in a loosely-coupled architecture. Agents are those elements which describe the mental attitudes and/or the intention of each component. For example, components of a business application or an SCA model can be designed in analogy to agents' development, which can then intelligently adapt to changing environment conditions. As explained below, BDI based design will help to map with an SCA platform.

SCA—Role in SOA

With a growing emphasis on SOA, there is a heightened focus on its deployment, success, and demonstrable return on investment (ROI). Companies can reduce IT spending significantly by implementing a service-oriented architecture. Service-oriented architecture aims at aligning IT with the needs of the business. SOA is more than collection of web services; it includes modeling, assembling, deploying, and monitoring of SOA. Implementation of SOA was difficult due to a lack of proper API's which would facilitate the building of applications using SOA.

Many new technologies are emerging to make implementation of SOA easier. SCA came out as collaborative effort driven by IBM, Oracle, BEA, SAP and several other industry leaders to simplify creation and implementation of SOA. SCA is a specification which describes a model for building applications and systems using SOA. It provides a platform through which SOA can be easily implemented to design new or existing applications. SCA also simplifies the integration of applications which are SOA compliant.

SCA is component-based architecture. It models business logic code implementation as components, which expose its functionality through service-oriented interfaces and consume functionality provided by other components through their service-oriented interfaces. Under this architecture, functionalities may first be implemented into components, which may in turn use other services. These components may then be assembled to build the desired application by designing the flow of components to achieve the desired business logic. Moreover, SCA provides the ability to represent business logic as a reusable component so that it can be integrated into other SCA-compliant applications.

Business logic is separated from implementation in SCA. Implementation logic for services may be written in any of the given languages: Java, PHP, C++, COBOL, BPEL, XSLT, as well as in SQL and XQuery. Even security, transaction, and reliable messaging are separated from implementation code.

Figure 2:
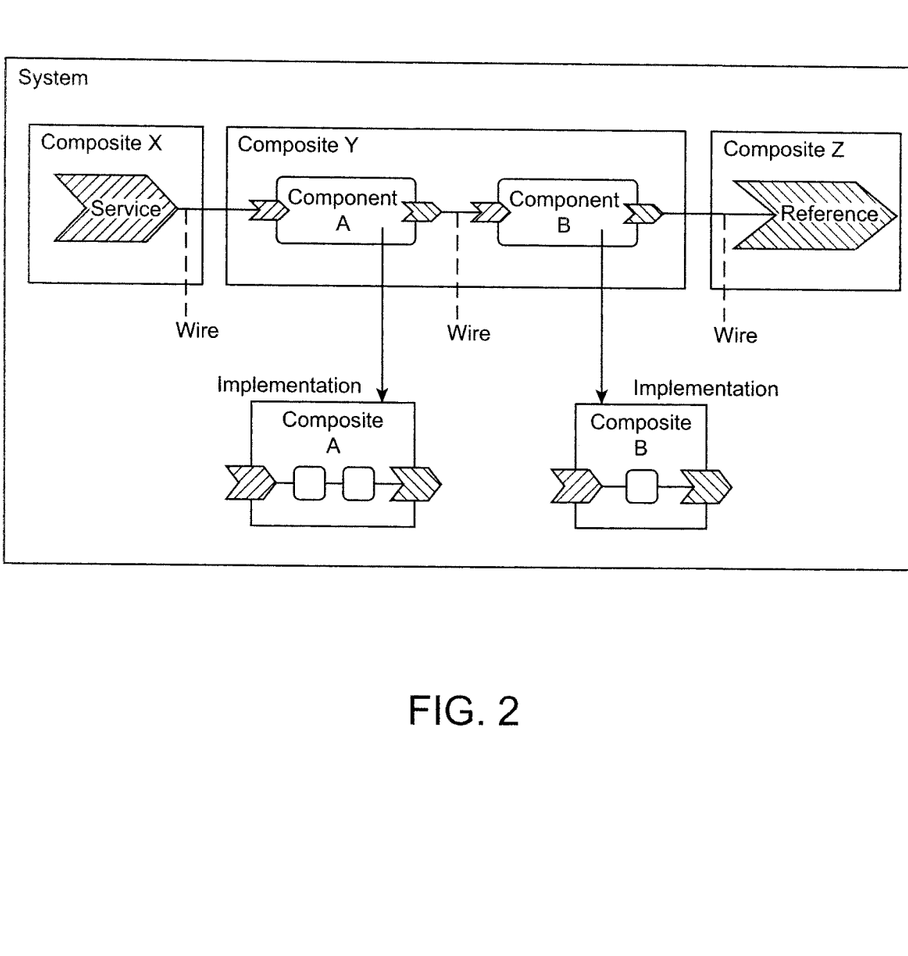
FIG. 2 is an overview of a Service Component Architecture (SCA) system.

Referring to FIG. 2, an overview of an exemplary SCA system is illustrated. The communication between the services may be done through wiring. The assembly model deals with the aggregation of components and the linking of components through wiring using composites. The assembly model is independent of implementation language. The client and implementation specifications deal with the implementation of services and of service clients—each implementation language has its own client and implementation specification, which describes the SCA model for that language.

Gaps in Existing SCA Design Methodology

SCA uses components that implement business logic for SOA organization of business application code. These components offer their capabilities through service-oriented interfaces called services. Moreover, these components consume functions offered by other components through service-oriented interfaces, called references. SCA consists primarily of two steps in building a service-oriented application:

The implementation of components which provide services and consume other services The assembly of sets of components to build business applications, through the wiring of references to services.

SCA emphasizes the decoupling of service implementation and service assembly from the details of infrastructure capabilities and from the details of the access methods used to invoke services. SCA components operate at a business level and use a minimum of middleware APIs.

SCA has not, however, defined the procedure for designing the components and assembly component in totality. The specification does not explain the decisions to design and model the components in the business domain. A prerequisite of defining the components (value proposition, re-usable, aligned to business goals) and its assembly would help SCA to be embraced by the business as well as the technical analysts.

Any information system or business may be designed in their apt social operational environment as envisioned by the business analyst. The early requirement phase that looks at the various stakeholders, resources, their relationships are totally incoherent from artifacts like objects, data, interfaces in the development phase. The stakeholders from the requirement phase are not in sync with stakeholders from the development phase.

By understanding the organizational model by formal methods will help to build a collaborative and sustainable solution. Decomposing the organizational model to various relative goals within its collaborative relationship with others in the environment will ease the understanding of complex business systems. There is a need to have a general engineering and generic uniform understanding of the entities and its goals across the lifecycle of software development.

This disclosures proposes the understanding of BDI to every stakeholder in the organization (which is the basic formal methods of understanding the operational environment in existence in any organization). To model the operational environment of the organization before implementation via SCA, this disclosures describes the early requirements and late requirements phases of the Tropos software development methodology. Then, the mapping of BDI to both an i* model and to SCA entities is described. This framework will be utilized in building an SCA system in an exemplary case study of a business to business (B2B) marketplace.

Exemplary Case Study

The exemplary B2B marketplace is an auction business system which allows sellers and bidders to have a healthy transaction over the Internet. The sellers enter into the system with different kinds of products. Each seller has his or her own credibility to auction their products for a higher price. The system invites the bidder (via any medium) to have a fair trial and takes the responsibility of the operations of procuring and delivering the products.

Goal: The goal of the exemplary B2B Marketplace system is to assist in selling the best products and also sustain the trust of the bidders, with a tab on the quality of products.

Early Requirements Analysis of i* Model

Early requirements are the most prominent phase of development and mandate a clear understanding of the intentions of the stakeholders in the environment. Early requirements call for a study of the organizational environment to solve the problem and present a model with relevant actors, their needs, goals, and inter-dependencies.

Figure 3:
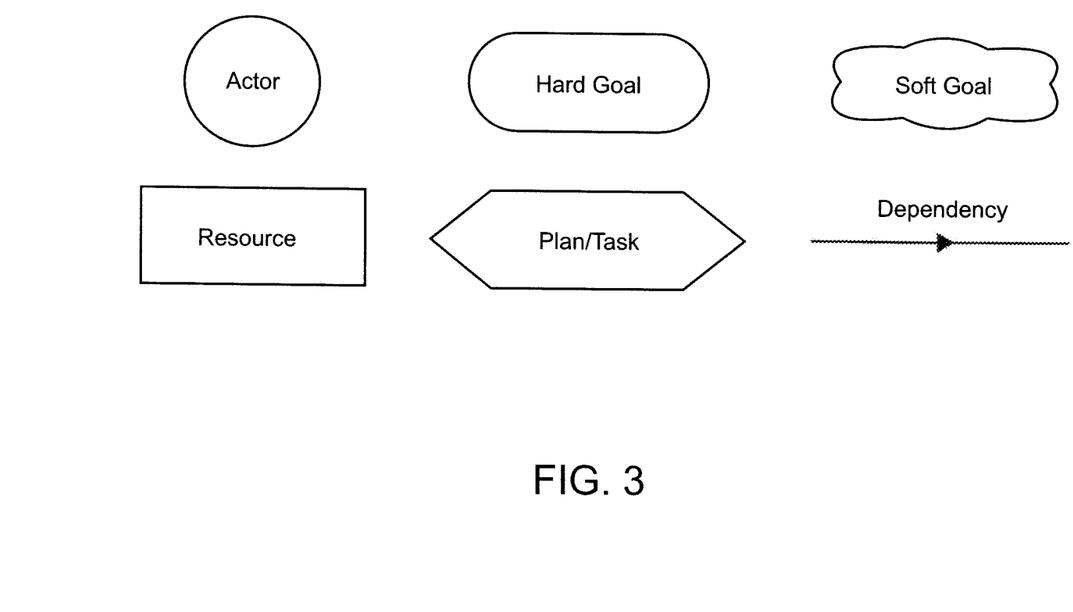
FIG. 3 is a depiction of exemplary TAOM4E notations.

The intentions of stakeholders are modeled as goals which, through any suitable form of goal-oriented analysis, eventually lead to the functional and non-functional requirements of the system-to-be. In an i* model (e.g., strategic dependency model with an underlining distributed intentionality framework), the actors are dependent on one other for their goals to be achieved and additionally have one or more soft goals to be satisfied. The i* framework has been related to requirements engineering and is described in detail in: E. Yu. "Modeling Organizations for Information Systems Requirements Engineering." Proc. Of the $1^{st}$ Int. Symposium on Requirements Engineering, RE '93, pp. 34-41, San Jose, Calif. January 1993. Exemplary models have been built using the TAOM4E tool. FIG. 3 depicts exemplary TAOM4E notations: actors, hard goals, soft goals, and the resources involved in the environment. The elements in a first i* model for the exemplary B2B Marketplace is shown in FIG. 4.

The primary actors are Seller, Auction Place, Operations, and Buyer (or Bidder). Seller registers its products and depends on the Auction Place to fulfill its goals. The Auction Place, by virtue of its service, would like to deserve 'good improved quality' from sellers. This type of dependency describes the nature of agreement. Thus, the Auction place, with its dependency on Seller, can improve on its business. The dependum 'Improved Quality' is shown as a soft goal, as it is derived and not operationally defined in a precious manner.

Figure 4:
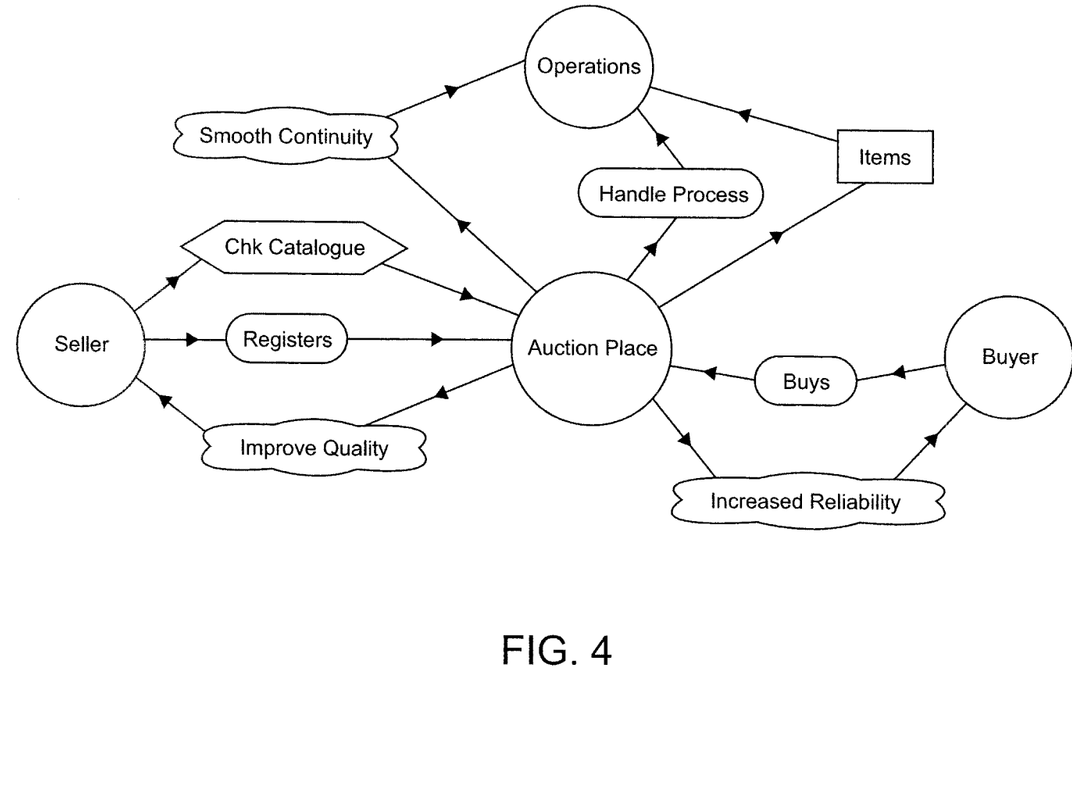
FIG. 4 is an exemplary i* model for a business to business (B2B) marketplace.

The exemplary B2B Marketplace strategic dependency model depicted in FIG. 4 explains the dependency of each actor on other actors in terms of goals, soft goals, and resources. The 'Auction Place' actor is essential for making the auction transaction process successful. It uses operations for processing and delivering the products to the winning bidder. 'Auction Place' depends on 'Operations' for smooth continuity of the business. 'Smooth Continuity' is a soft goal, which is subjective in nature. Buyer (or Bidder) bids and buys products from the market place.

Late Requirements Analysis of i* Model

Late Requirements delves deeper into each of the actors by describing their elaborate functions and qualities with respect to the organizational environment. It describes all the functional and non functional requirements. The representation focuses on a few actors with all of its tasks or plans that fulfill the goals. Late Requirements breaks down into chunks of actors and develops a model to elaborate the requirements in finer details.

Figure 5:
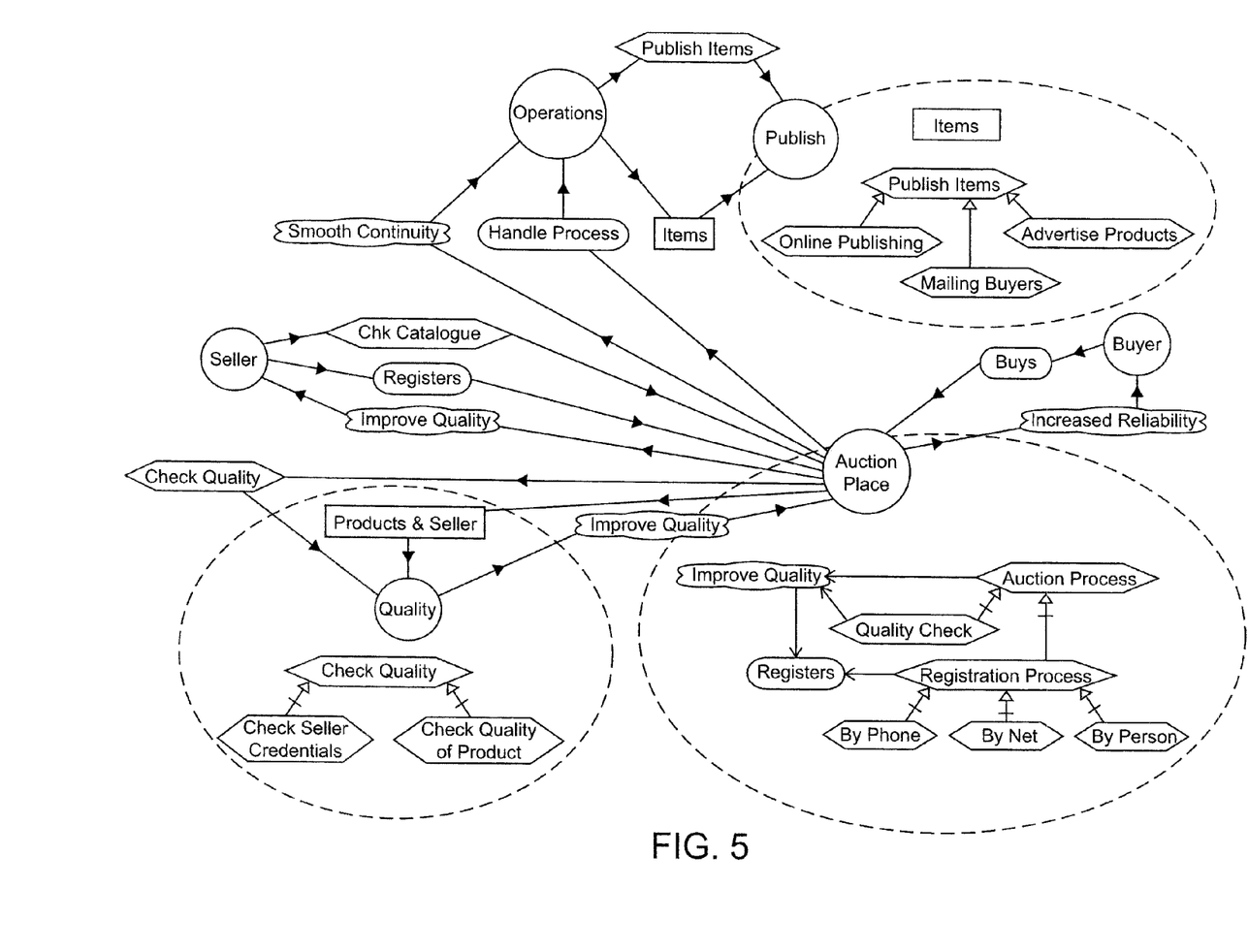
FIG. 5 is an exemplary strategic dependency model and means-end analysis for the B2B marketplace of FIG. 4.

FIG. 5 introduces 'Quality' and 'Publish' as two new actors participating in the strategic dependency model. 'Auction Place,' in order to fulfill the soft goal dependency 'Improve Quality,' needs to outsource the capability to another actor 'Quality'. After a product has been registered, the product needs to be published or advertised for greater visibility. The 'Publish' actor takes up this responsibility and indirectly helps 'Operations' to achieve the smooth continuity of the business.

FIG. 5 also focuses on the soft goals for some actors, e.g., 'Quality.' In particular, to improve on the quality of products being sold through the auction place, the same goal can be achieved via the 'Check Quality' task. The 'Check Quality' task is decomposed into 2 sub-tasks that can be executed simultaneously. One task is to check the seller's credentials, and the other is to check the quality of the product sold by the seller. That means the goal 'improve quality' is fulfilled by both the tasks. The resource dependencies for 'Quality' will be details about 'Products & Sellers'.

For the 'Publish' actor, any of the tasks can be executed accordingly, depending on the seller's requests or privileges. The 'Publish Items' task has been decomposed into tasks 'Online Publishing,' 'Mailing Buyers,' and 'Advertise Products.' The goal to publish can be achieved by one of the tasks. The decomposition eventually allows for identifying actors to achieve goals by executing tasks accessing some required resource.

The next step—unlike in the agent-oriented methodology Tropos—will entail mapping the exemplary model to a BDI architecture to design the SCA components. The architectural design in Tropos explains the design of different sub-agents and interconnection through data or control by virtue of organizational social patterns. The social patterns will help to define a cooperative distributed architecture which might scale differently for attributes like security, adaptability, coordinability, cooperativity, availability, integrity, modularity or aggregability.

i*—BDI—SCA Mapping

BDI Significance: Business—IT alignment

Agents are necessarily those elements of the system that are used to describe the mental attitudes, and more particularly the intention, of the user. Clearly, a software component can represent an intention and also act as a web service. Here, a BDI paradigm is mapped to the component definition of SCA architecture such that the user's mental attitude is encapsulated. The approach is close to a service-based paradigm, but utilizes a more formal logic-based methodology.

The BDI model has some philosophical basis in the Belief-Desire-Intention theory of human practical reasoning. Four characteristics of intelligent agents which naturally fit the purpose and design of the BDI model include:

Situated—they are embedded in their environment
Goal directed—they have goals that they try to achieve
Reactive—they react to changes in their environment
Social—they can communicate with other agents (including humans)

Next, the designing of a component using beliefs, desire, and intention is described. BDI mapping is the glue between IT and a business environment. Traceability issues are bridged, and business analysts and technical experts can talk in the same language.

Figure 6:
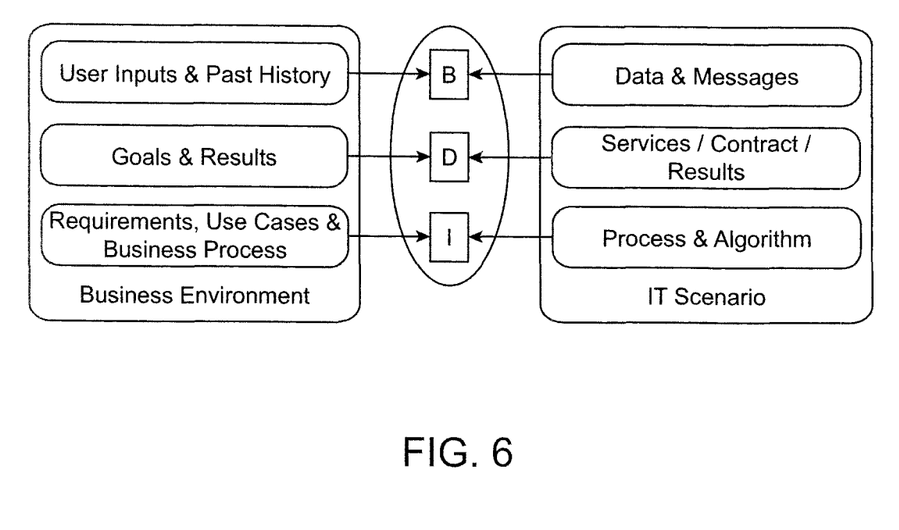
FIG. 6 is a generic mapping of BDI in an exemplary business and information technology scenario.

Consider an exemplary banking domain problem of creating an account. The main goal here is to create an account. The main goal can further be divided into such sub-goals as fill a form, get verification done, get approval, then open an account, etc. A given goal g can be achieved by executing the sub goals $g_0$, $g_1$, and $g_3$ in order. This way of using agent-oriented software engineering will allow a component to relate its intentions to user goals. FIG. 6 depicts a generic mapping of BDI in an exemplary business and IT scenario. Agent-oriented decompositions based upon functions/actions/processes are more intuitive and easier to produce than those based upon data/objects. This notion is further acknowledged within the object-oriented community (see e.g., B. Meyer (1988) "Object-oriented software construction" Prentice Hall).

As organizations seek to align business and IT architectures, SOA may play a key role in streamlining this process. SCA emerged as a standard to make implementation of SOA easier. SCA helps in modeling services as components and assembly methods which are used to connect them. SCA clearly provides an effective solution for applications to be modeled using SOA. Using SCA, IT teams model the assembly of components to solve the business solution, and the business analysts are able to easily understand the technology agnostic SCA model.

However, the converse is not present in SCA. That is, IT's understanding of a business' requirements in the same language as that of a business analyst is not present in SCA. BDI mapping provides a platform for both technical and business analysts to speak the same language about the business.

SCA does not provide any means by which to define a component or to define what a component goal is. That is, SCA fails in defining how to model a component. Having a BDI mapping into SCA component design helps in encapsulating the intentions of the user effectively. Consider, for example, a banking domain where a user needs to create an account. The main goal here is to create an account, which can be further decomposed into basic actions. As such, this disclosure describes the use of a belief desire, and intention paradigm to design components of SCA. Components designed in the form of goals they wish to achieve rather than actions they wish to perform will be more effective.

i*—BDI—SCA Transition

Figure 7:
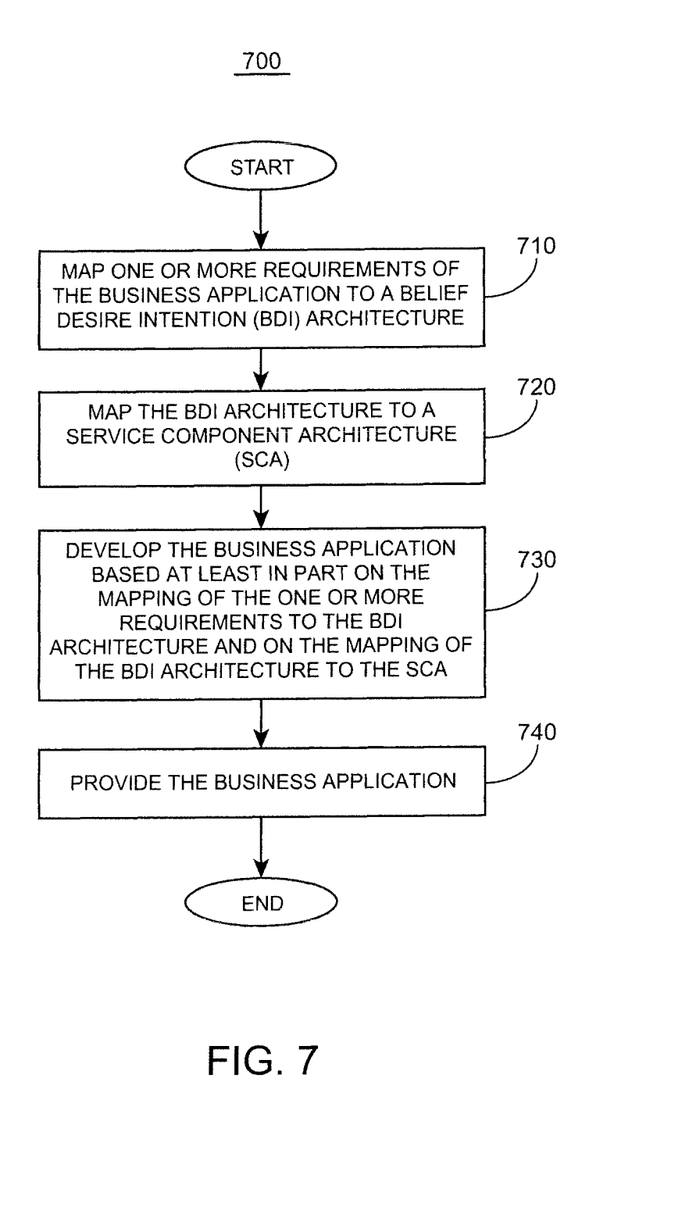
FIG. 7 is a flowchart of an exemplary method for developing a business application.

Referring to FIG. 7, a flowchart of an exemplary method 700 for developing a business application is illustrated. With reference to FIGS. 1 and 7, the method 700 includes step 710 in which a business application development computing device 12 maps one or more requirements of the business application to a Belief Desire Intention (BDI) architecture. The one or more requirements may include one or more of an actor, a resource, a hard goal, a soft goal, and a task, although other types and numbers of suitable requirements could be used. The BDI architecture may include, for example, one or more of an agent, a belief, a desire, and an intention, although the architecture could have other configurations. In some embodiments, the mapping of the one or more requirements to the BDI architecture may further include mapping the actor to the agent, the resource to the belief, the hard goal and the soft goal to the desire, and the task to the intention, although other types of mapping to other elements could be used.

In step 720, the business application development computing device 12 maps the BDI architecture to a Service Component Architecture (SCA). The SCA may include, for example, one or more of a component, a database, a service business contract, and a service implementation, although the SCA may have other types and numbers of elements. In some embodiments, the mapping of the BDI architecture to the SCA further includes mapping the agent to the component, the belief to the database, the desire to the service business contract, and the intention to the service implementation.

In step 730, the business application development computing device 12 develops the business application based at least in part on the mapping of the one or more requirements to the BDI architecture and on the mapping of the BDI architecture to the SCA.

In step 740, the business application development computing device 12 provides the business application.

Figure 8:
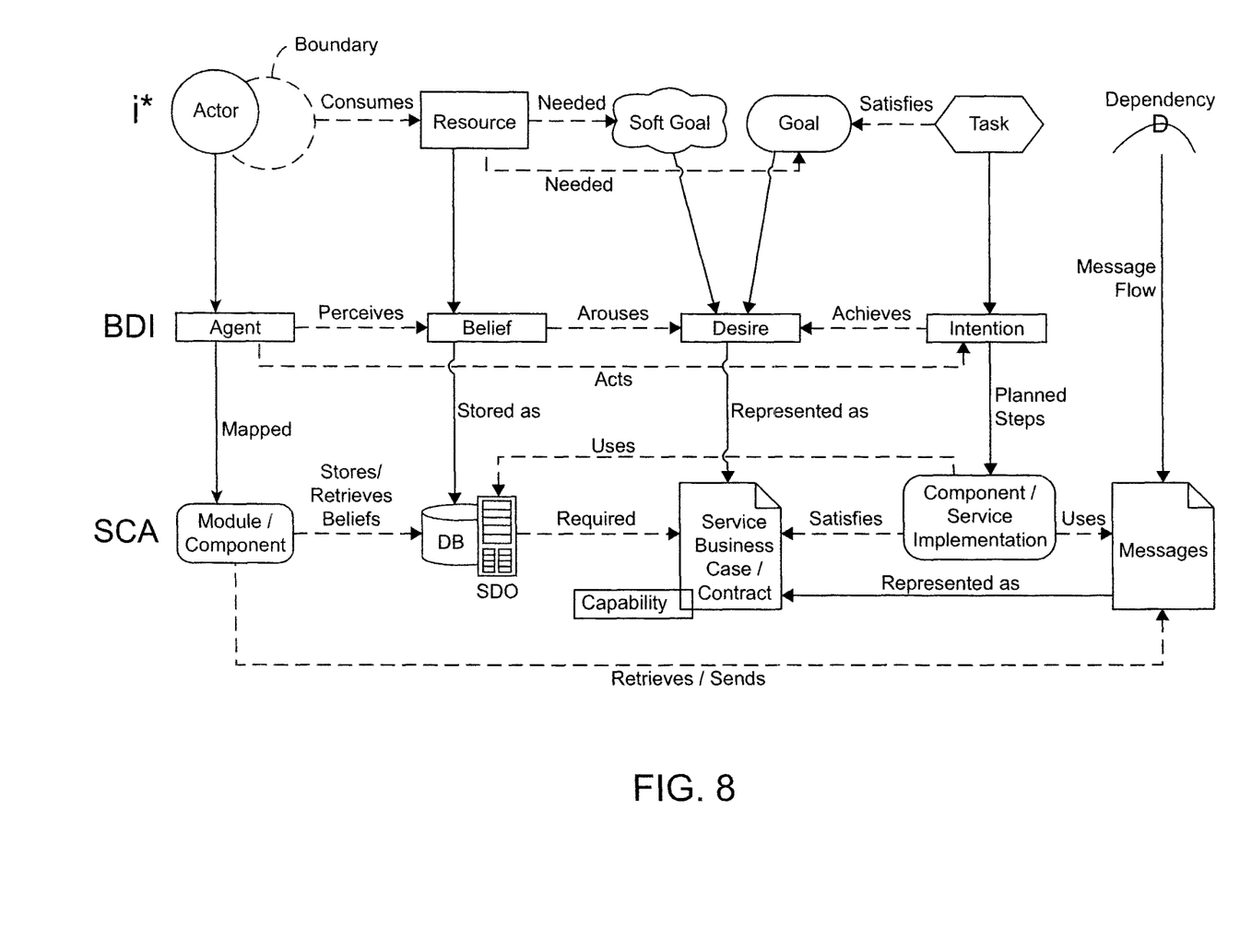
FIG. 8 is an exemplary i*—BDI—SCA mapping.

Referring to FIG. 8 an exemplary i*—BDI—SCA mapping is illustrated. In particular, FIG. 8 displays an exemplary mapping between concepts of an i* model from early requirements to BDI, and then BDI to SCA entities. The Actor or sometimes the Actor boundary may be mapped to BDI Agents which hold resemblance to the Modules/Components of SCA. Resources are key to any business, and these may be mapped to Belief. Belief may include the past history or information store like the Databases in an SCA model. Goals may include Hard Goals, Soft Goals, or both. Hard Goals may include capabilities of a component to suffice the business deals. Soft goals may include intangible assets that are desired for growth of the business or organization. Hard Goals and Soft Goals may be mapped to the Desire for each component. Every component may expose itself as service with a well-defined business proposition. Similarly, the Desires of the components may be exposed as Service Business Contracts defining the Business Case and its non-functional requirements.

Task may be mapped to Intention in BDI that may complete plans to achieve the Desire or Goal of a particular component. In an SCA context, the Component or Service Implementations may include the plans that can be executed to fulfill the requirements or Service Business Contracts. Depending on the social patterns, Task may be fine-grained or coarse-grained. In the case where the Task is coarse-grained, the Task may be implemented by a composition of tasks.

Finally, wiring or assembly of all the related components, dependency from the i* model may map to the message flow or the SDO flow to respective components. This may wire the components to fulfill the goal of the organization in totality.

SCA Design

Based on the above i*—BDI—SCA mapping, the exemplary B2B Marketplace case study may be designed leveraging the SCA concepts and using a SCA tool. The SCA tool utilized for the exemplary case study is Apache Tuscany.

Figure 9:
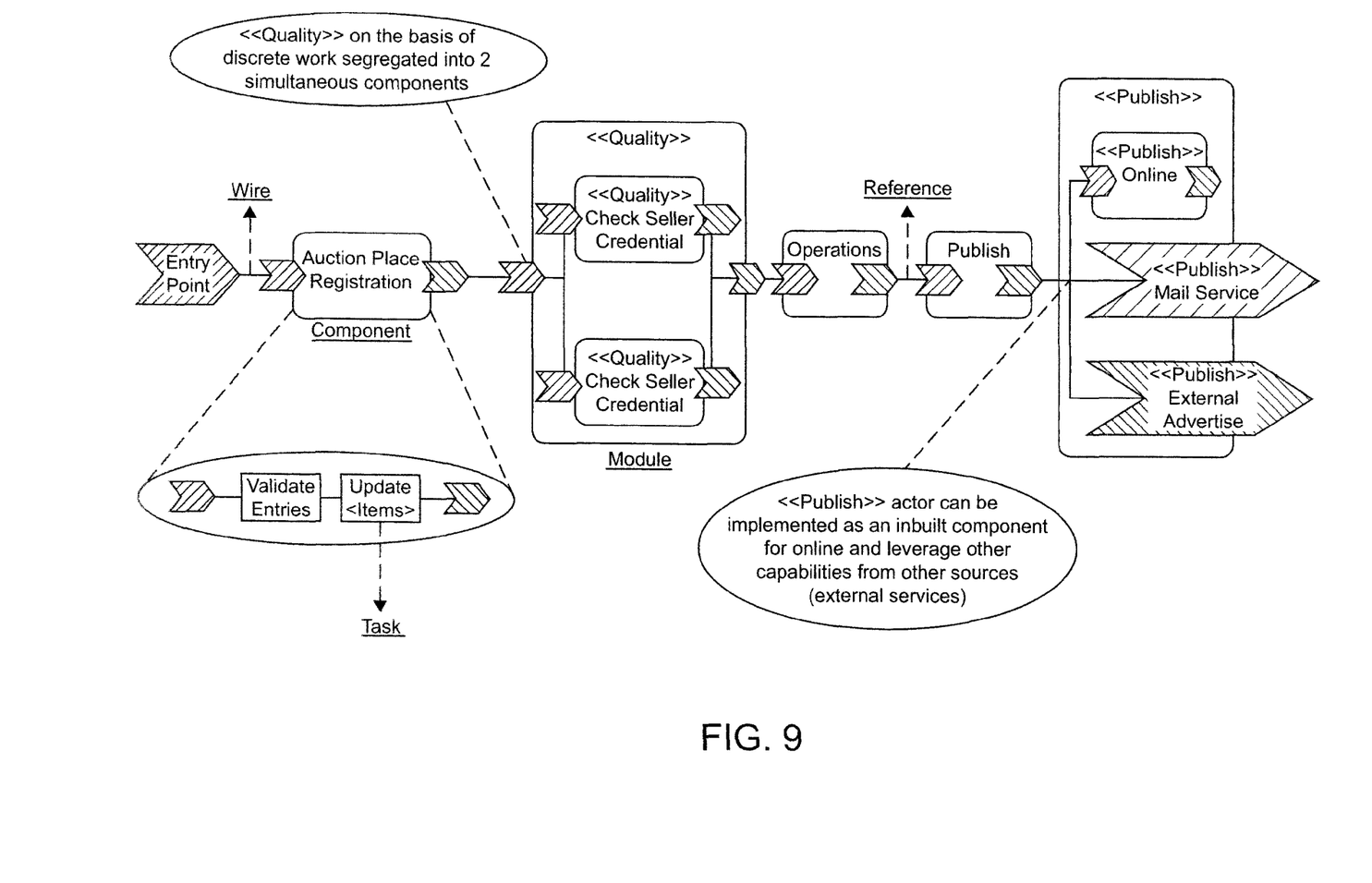
FIG. 9 is an exemplary SCA build view of the B2B marketplace of FIG. 5.

Referring to FIG. 9, the SCA designed system or build view of the B2B Marketplace is illustrated. In particular, FIG. 9 is the transition of a subset of sequence activities from FIG. 5. Using the i*—BDI—SCA mapping, FIG. 9 wired the different actors to provide the registration transaction process orchestration in the exemplary case study.

'Auction Place' actor boundary is translated to a component. The implementation of the component can be done leveraging the local service objects or BPEL based implementation. Component implementation can take cue from the various tasks presented in the 'Auction place' actor boundary in FIG. 5. In this way, the intention of the user is captured using a BDI mapping into components.

'Auction Place Registration' component may need to be wired to the Quality module. The relationship may be made to fulfill the soft goal of 'Improve Quality.' Quality actor in FIG. 5 has been transitioned to Quality module in FIG. 9. Quality module may include a parallel execution of two tasks simultaneously. Quality module of FIG. 9 depicts the same. Quality module may work or access the 'Products & Seller' schema in the database for related information. The input to Quality module may be the validated product and seller information. The reference of the Quality module may touch point the Operations component next in the sequence for completing a registration process.

Similarly 'Operations' actor may be translated into Operations component and may work on the 'Items' schema in the database store. Publish component is peculiar in the exemplary case study. It simulates the Publish Actor Boundary in FIG. 5. But in a real-case scenario, services like mailing can be reused from other modules or domains. 'Advertise' task from FIG. 5 can be outsourced to an external service provided by some vendor. So, the Publish module can be built and execute accordingly with respect to the privileged services for the seller accepted.

Advantages: Business—Technical Gap Bridged

While the current SCA specification may be effective, it is not complete without providing a means to relate the user goals to the capabilities of the services. Agent-mapped components act as representational tools for storing and manipulating the mental attitudes of the user. BDI agent mapping provides an effective means to encapsulate the user intentions. The enhanced SCA architecture with BDI mapping strategy extends various benefits:

Elegant logical formalisms and practical applications of the architecture to real world problems Technology agnostic architecture Enhanced business-IT alignment Modeling and assembly of business applications with improved component elicitation and identification Adapt to rapidly changing business requirements Conclusion Agent-oriented software engineering should evolve to concentrate on higher-level capabilities that integrate the components into highly flexible solutions to meet the user intentions. BDI mapping for cognitive understanding of business systems via i* models will help in designing the SCA architecture. Additional improvements may include utilizing social architecture styles and behavioral patterns for articulating component capability and designing robust loose coupled distributed systems. Agent-based requirement engineering will help to build service or componentized architecture implemented across different operating environments and platforms.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for developing a business application comprising:

mapping, by a business application development computing device, one or more requirements of the business application to a Belief Desire Intention (BDI) architecture, the BDI architecture comprising an intention characteristic comprising tasks comprising coarse-grained tasks implemented by a composition of tasks;

mapping, by the business application development computing device, the BDI architecture to a Service Component Architecture (SCA);

developing, by the business application development computing device, a business application based at least in part on the mapping of the one or more requirements to the BDI architecture and on the mapping of the BDI architecture to the SCA, wherein the developed business application comprises parallel execution of tasks; and providing, by the business application development computing device, the business application.

2. The method of claim 1, wherein the BDI architecture further comprises one or more of an agent, a belief characteristic, or a desire characteristic.

3. The method of claim 2, wherein the mapping of the BDI architecture to the SCA comprises mapping each of the one or more of the agent, the belief characteristic, the desire characteristic, or the intention characteristic to the SCA.

4. The method of claim 3, wherein the SCA comprises one or more of a component, a database, a service business contract, or a service implementation.

5. The method of claim 4, wherein the mapping of the BDI architecture to the SCA further comprises mapping the agent to the component, the belief characteristic to the database, the desire characteristic to the service business contract, or the intention characteristic to the service implementation.

6. The method of claim 5, wherein the one or more requirements comprise one or more of an actor, a resource, or a goal.

7. The method of claim 6, wherein the mapping of the one or more requirements to the BDI architecture further comprises mapping the actor to the agent, the resource to the belief characteristic, or the goal to the desire characteristic.

8. A non-transitory computer-readable storage medium having stored thereon instructions for developing a business application, the instructions comprising machine executable code which, when executed by at least one processor, causes the processor to perform steps comprising:

mapping one or more requirements of the business application to a Belief Desire Intention (BDI) architecture, the BDI architecture comprising an intention characteristic comprising tasks comprising coarse-grained tasks implemented by a composition of tasks;

mapping the BDI architecture to a Service Component Architecture (SCA);

developing the business application based at least in part on the mapping of the one or more requirements to the BDI architecture and on the mapping of the BDI architecture to the SCA, wherein the developed business application comprises parallel execution of tasks; and providing the business application.

9. The medium as set forth in claim 8, wherein the BDI architecture comprises one or more of an agent, a belief characteristic, or a desire characteristic.

10. The medium as set forth in claim 9, wherein the mapping of the BDI architecture to the SCA comprises mapping each of the one or more of the agent, the belief characteristic, the desire characteristic, or the intention characteristic to the SCA.

11. The medium as set forth in claim 10, wherein the SCA comprises one or more of a component, a database, a service business contract, or a service implementation.

12. The medium as set forth in claim 11, wherein the mapping of the BDI architecture to the SCA further comprises mapping the agent to the component, the belief characteristic to the database, the desire characteristic to the service business contract, or the intention characteristic to the service implementation.

13. The medium as set forth in claim 12, wherein the one or more requirements comprise one or more of an actor, a resource, or a goal.

14. The medium as set forth in claim 13, wherein the mapping of the one or more requirements to the BDI architecture further comprises mapping the actor to the agent, the resource to the belief characteristic, or the goal to the desire characteristic.

15. A business application development computing device comprising:

one or more processors;

a memory coupled to the one or more processors which are configured to be capable of executing programmed instructions comprising and stored in the memory to:

map one or more requirements of the business application to a Belief Desire Intention (BDI) architecture, the BDI architecture comprising an intention characteristic comprising tasks comprising coarse-grained tasks implemented by a composition of tasks;

map the BDI architecture to a Service Component Architecture (SCA);

develop the business application based at least in part on the mapping of the one or more requirements to the BDI architecture and on the mapping of the BDI architecture to the SCA, wherein the developed business application comprises parallel execution of tasks; and provide the business application.

16. The device as set forth in claim 15, wherein the BDI architecture comprises one or more of an agent, a belief characteristic, or a desire characteristic.

17. The device as set forth in claim 16, wherein the mapping of the BDI architecture to the SCA comprises mapping each of the one or more of the agent, the belief characteristic, the desire characteristic, or the intention characteristic to the SCA.

18. The device as set forth in claim 17, wherein the SCA comprises one or more of a component, a database, a service business contract, or a service implementation.

19. The device as set forth in claim 18, wherein the mapping of the BDI architecture to the SCA further comprises mapping the agent to the component, the belief characteristic to the database, the desire characteristic to the service business contract, or the intention characteristic to the service implementation.

20. The device as set forth in claim 19, wherein the one or more requirements comprise one or more of an actor, a resource, or a goal.

21. The device as set forth in claim 20, wherein the mapping of the one or more requirements to the BDI architecture further comprises mapping the actor to the agent, the resource to the belief characteristic, or the goal to the desire characteristic.

* * * * *